United States Patent [19]

Repetto

[11] Patent Number: 5,325,260

[45] Date of Patent: Jun. 28, 1994

[54] AC POWER AND CONTROL FOR ELECTRO-MAGNET LIFTS

[76] Inventor: Julio C. Repetto, 9891 Brockbank Dr., Dallas, Tex. 75220

[21] Appl. No.: 883,154

[22] Filed: May 14, 1992

[51] Int. Cl.$^5$ .......................................... H01H 47/00
[52] U.S. Cl. .................... 361/144; 307/125; 361/189
[58] Field of Search ............ 307/112, 113, 116, 125, 307/126, 43, 64, 66; 361/139, 143, 144, 160, 171, 189, 194, 195, 206

[56] References Cited

U.S. PATENT DOCUMENTS

| | | | |
|---|---|---|---|
| 4,264,887 | 4/1981 | Barrett | 335/291 |
| 4,354,149 | 10/1982 | Armond et al. | 320/40 |
| 4,739,969 | 4/1988 | Eckersley et al. | 354/378 |

Primary Examiner—Jeffrey A. Gaffin
Attorney, Agent, or Firm—Warren Kintzinger

[57] ABSTRACT

An AC powered electro-magnet lift is provided with AC rectification and control requiring low maintenance. The control system is light and relatively small, and quiet with, very little noise, minimal sparking between contacts, no extremely high voltage and contactors operational for hundreds of thousands if not millions of times. A mercury switch control of system relays has low and predictable contact resistance. This control of an electro-magnet handles a variety of loads with assured consistent switching with the system moisture resistant and having high dielectric coefficients where required.

20 Claims, 4 Drawing Sheets

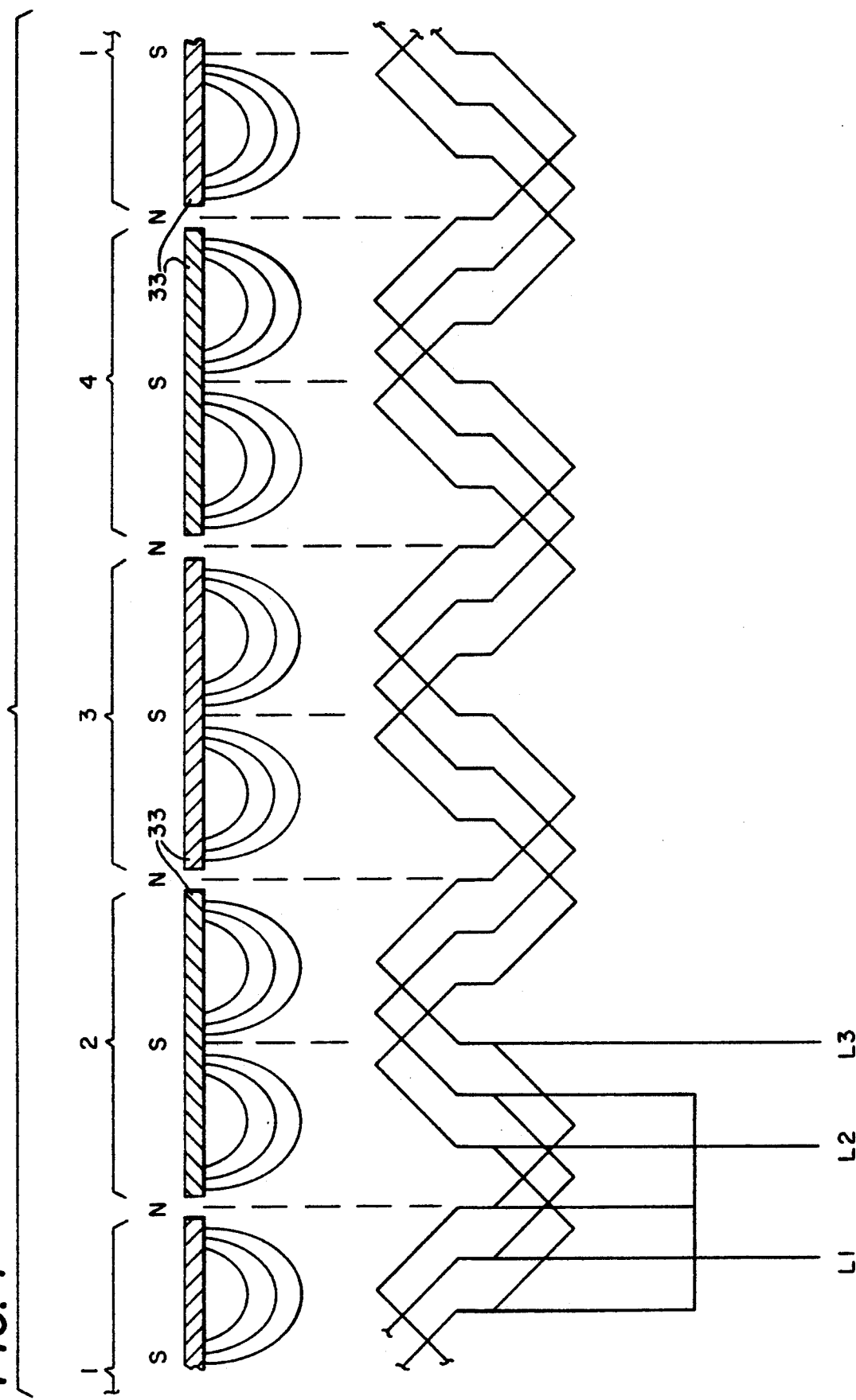

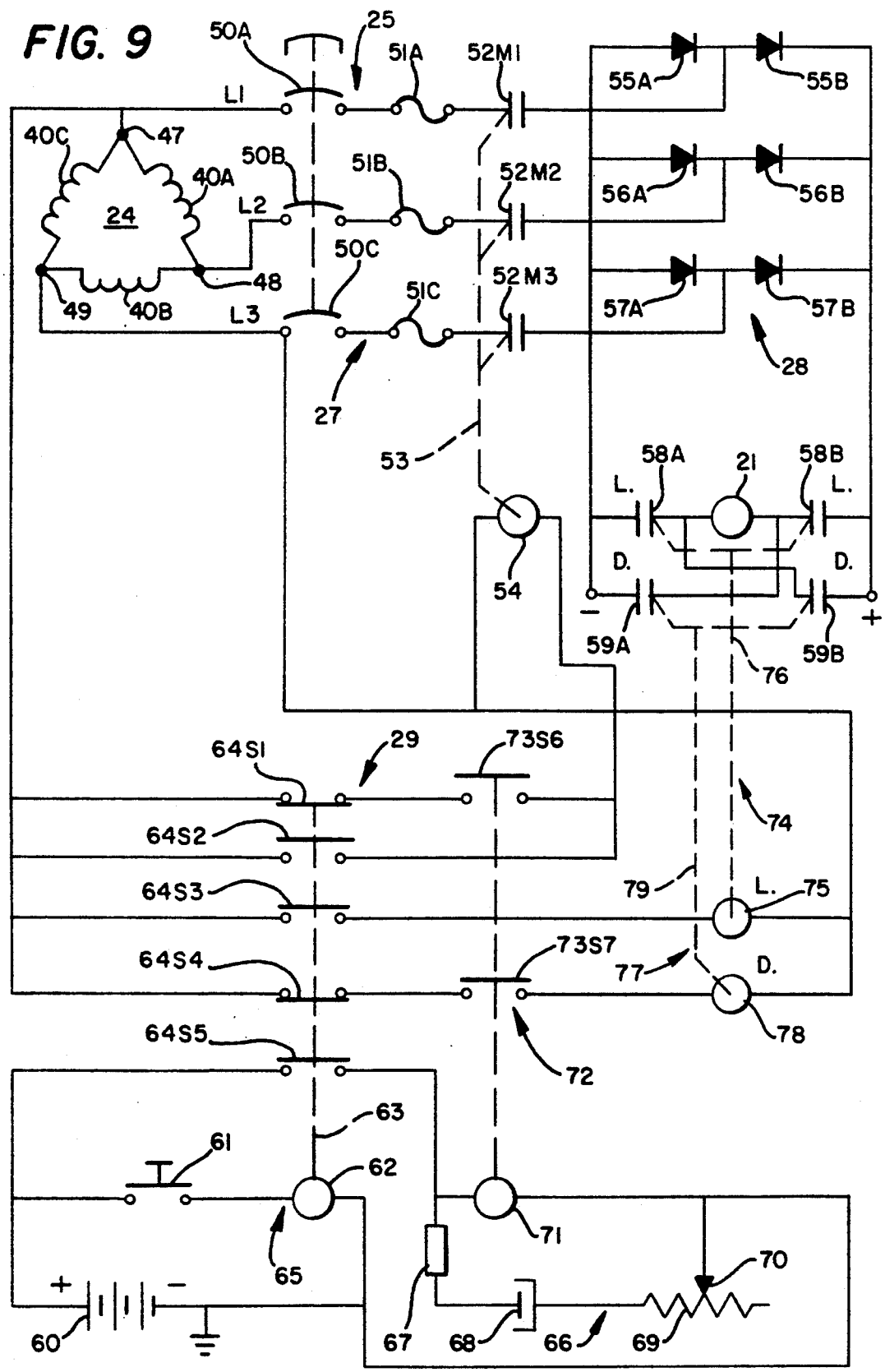

AC POWER AND CONTROL FOR ELECTRO-MAGNET LIFTS

Background and Field of the Invention

This invention relates in general to electro-magnet lift magnets their power supply and controls, and more particularly, to lift magnets powered by AC rectified to DC and their control systems.

BACKGROUND AND FIELD OF THE INVENTION

Electro-magnet lift magnets like those installed on cranes have through the years used a DC generator, rheostat, electric controller and a lift-drop switch. Direct current generators many times are a mechanical and electrical with commutators and specific rotation requirements having contributed to all kinds of maintenance problems. The controllers for such systems are big, heavy and strong requiring very large contacts and high voltage insulation all contributing to high component costs. In a sense the controller is the heart of such systems with the magnet controlled to lift magnetic material and then drop the material lifted in accord with a controller switch position. These controllers are electrical and mechanical devices designed to go "ON" and later "OFF". For example, when the controller switch is activated to the "ON" state heavy lift contacts through approximately one second press together with spring action to pass 240 volts at 50 amps through to the coils of the magnet for the magnet to be in the lift state. Then when the crane magnet has been moved to a drop position the operator puts the controller switch in the "DROP" position. This opens up the "LIFT" switch contacts and then-approximately one second later the lower rated "DROP" contacts close reversing the current through the pre-set time. At this most important critical moment of control when "DROP" starts after the "LIFT" contact is open there is a 30,000-50,000 volt arc fire. This is a critical amount of current to absorb with it important that the design of the control be such as to absorb the high voltage current in the order of 75% or more depending on the brand of control and magnet. The other approximate 25% goes to the magnet coils and magnetic field wise to magnet material. If the control does not reduce the voltage arc voltage current percentages 25-40% may go to the magnet. So in addition to heavy duty relay switch contact burn out you see magnet coils at ground., or in short, or open. With magnet costs of $10,000.00 plus repair costs of approximately $6,000.00 in such condition you have some $15,000.00-$16,000.00 invested. Further, high cost controllers designed to synchronize time with the induction factors of the magnet to reduce high voltage sparking require maintenance and repair by very special technicians. There ave not too many electricians working with generators, controllers and magnets who understand exactly what happens interplay wise when DC, inductivity and time factors all interplay in the same short time span.

Use of an alternator as a power source for an electro-magnet along with a new control system result in great advantages over the presently existing and pre-existing DC powered systems, and control with DC generator, for electro-magnets. First, an alternator has low maintenance, no commutator, no brushes, no high voltage excitation, no specific direction of rotation and no special personal attention in operation. Additionally, the control in such a lift magnet system, advantageously, over a conventional control, is lighter, quieter, low in noise, sparking reduced to a minimum if any, no high voltage and with switch contactors useable for millions of times. With a mercury displacement relay switch there is a low predictable contact resistance in a switch capable of handling a variety of loads with assured consistent switching. The switch is moisture resistant and employs high dieelectic value materials. There is a great reduction in maintenance costs along with increased equipment utilization by reduced downtime and high productivity. Personal attention is greatly reduced and both operational and maintenance costs are reduced.

SUMMARY OF THE INVENTION

It is therefore a principal object of this invention to provide a new highly efficient power supply and control system for electro-magnetic-lift magnets.

Another object is to make such lift .magnet systems safer and easier to operate than pre-existing DC powered magnet systems.

A further object is to lower electro-magnet costs and maintenance costs.

Still another object is to significantly increase lifting magnet service life between failures.

Features of the invention useful in accomplishing the above objects include, in an AC power sourced power and control for electro-magnetic lifts, an AC powered electro-magnetic lift provided with AC to DC rectification and control requiring low maintenance, The control system is light and relatively small, quiet, with very little noise, minimal sparking between contacts, no extremely high voltage and contactors operational for hundreds of thousands if not millions of times. A mercury switch control of system switch relays has low and predictable contact resistance. This control of and electro-magnet handles a variety of loads with assured consistent switching with the system moisture resistant and having high dieelectric coefficients where required. The system power is a 240 volt three phase alternator 60 and 150 cycled, 20-95 amperes with low maintenance requirements, having no commutator and no high voltage excitation.

Specific embodiments representing what are presently regarded as the best modes of carrying out the invention are illustrated in the accompanying drawings.

BRIEF DESCRIPTION OF THE DRAWINGS

In the drawings:

FIG. 7, a diagrammatic showing of the eight pole three phase alternator wiring diagram with four permanent magnets on the alternator rotor;

DESCRIPTION OF THE PREFERRED EMBODIMENTS

Figure 1:
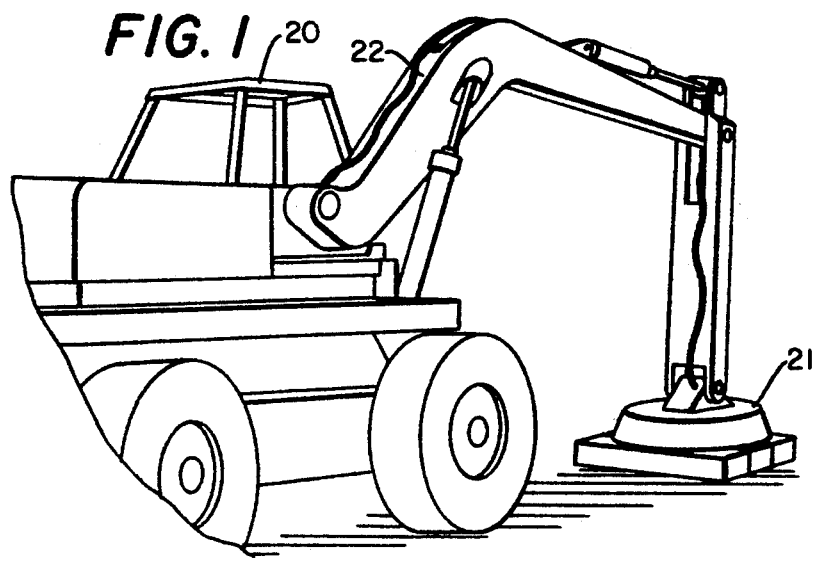
FIG. 1 represents a crane with a boom mounted electro-magnet lift magnet.
Figure 2:
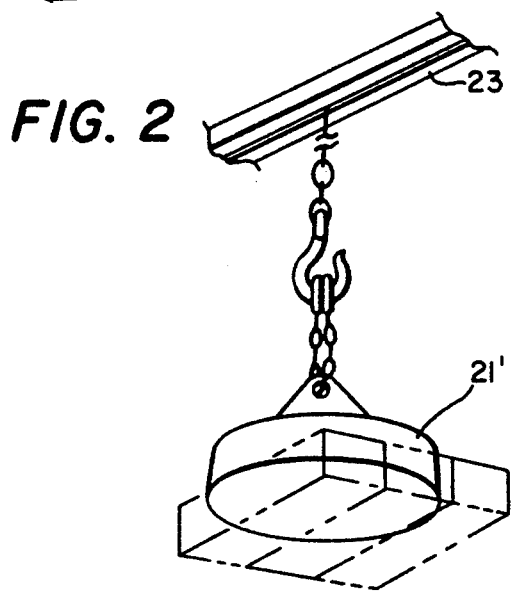
FIG. 2, a movable bridge mounted electro-magnet lift magnet.
Figure 3:
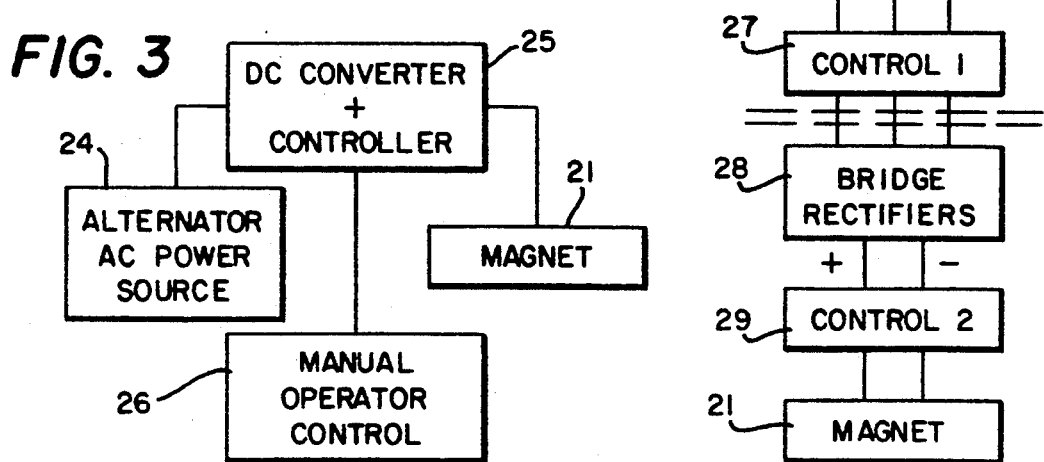
FIG. 3, a simple block diagram of a three phase alternator having permanent magnets output connected to bridge rectifiers, control circuit including a push bottom for manual operator control of a electro-magnet lift magnet.

Referring to the drawings:

The crane 20 of FIG. 1 is shown to be equipped with an electro-magnet lift magnet 21 mounted at the outer end of crane boom 22. In the alternate installation of FIG. 3 a movable bridge 23 mounts an electro-magnet lift magnet 21' that is fed AC power from a three phase line source (not shown).

Figure 4:
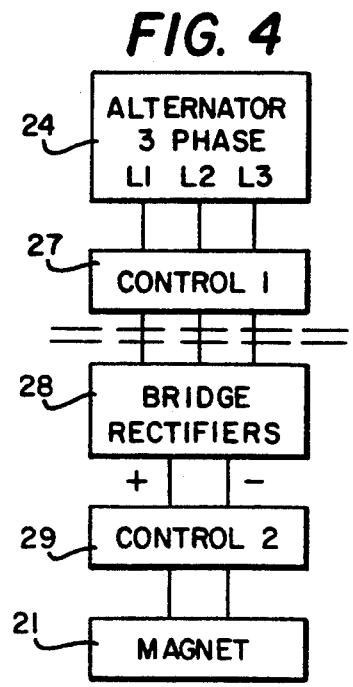
FIG. 4, another block schematic diagram of a three phase alternator power source to lift magnet system showing a split in control between the three phase AC area and DC areas of the system.

With electro-magnet lift magnets 21 such as installed in a crane 20 shown in FIG. 1, a three phase alternator 24 is used as an AC power source (see FIG. 3) feed connected to a DC converter and multi-level controlling circuit 25 having a manual push button operator control 26 for controlling lift and drop of electro-magnet lift magnet 21. The FIG. 4 block schematic diagram wise shows the three phase alternator 24 connected through a first level switching contact control 27 to a bridge rectifier section 28 and also a DC control section 29 controlling lift and drop of the electro-magnetic lift magnet 21.

Figure 5:
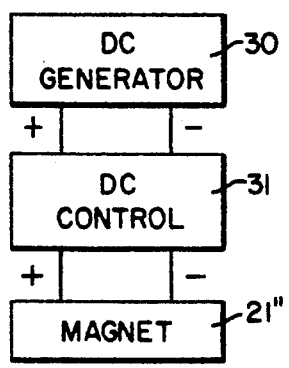
FIG. 5, a block schematic diagram of a pre-existing DC generator powered lift magnet system.

A DC generator 30 equipped prior art DC control circuit 31 to electro-magnet lift magnet 21" system is shown in general block schematic form in FIG. 5. Here again it should be noted that direct current (DC) generators many times are a mechanical and electrical nightmare with commutators and specific rotation requirements having contributed to all kinds of maintenance problems. The controllers for such systems are big, heavy and strong requiring very large contacts and high voltage insulation all contributing to high component costs. In a sense the controller is the heart of such systems with the magnet controlled to lift magnetic material and then drop the material lifted in accord with a controller switch position. These controllers are electrical and mechanical devices designed to go "ON" and later "OFF". For example, when the controller switch is activated to the "ON" state heavy lift contacts through approximately one second press together with spring action to pass 240 volts at 50 amps through to the coils of the magnet for the magnet to be in the lift state. Then when the crane magnet has been moved to a drop position the operator puts the controller switch in the "DROP" position. This opens up the "LIFT" switch contacts and then approximately one second later the lower rated "DROP" contacts close reversing the current through a pre-set time. At this most important critical moment of control when "DROP" starts after the "LIFT" contact is open there is a 30,000–50,000 volt arc fire. This is a critical amount of current to absorb with it important that the design of the control be such as to absorb the high voltage current in the order of 75% or more depending on the brand of control and magnet. The other approximate 25% goes to the magnet coils and magnetic field wise to magnet material. If the control does not reduce the voltage arc voltage current percentages 25–40% may go to the magnet. So, in addition to heavy duty relay switch contact burn out you see magnet coils at ground, or in short, or open. With magnet costs of $10,000.00 plus repair costs of approximately $6,000.00 in such condition you have some $15,000.00–$16,000.00 invested. Further, high cost controllers designed to synchronize time with the induction factors of the magnet to reduce high voltage sparking require maintenance and repair by very Special technicians. There are not too many electricians working with generators, controllers and magnets who understand exactly what happens interplay wise when DC, inductivity and time factors all interplay in the same short time span.

Figure 6:
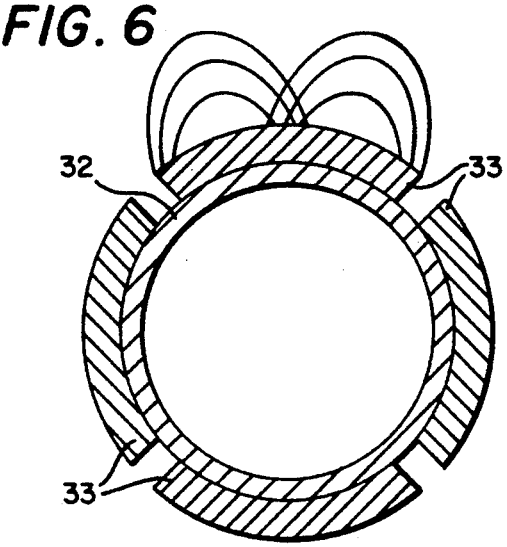
FIG. 6, a cross sectional view of the rotor of the three phase alternator with four permanent magnets mounted around the periphery thereof.
Figure 8:
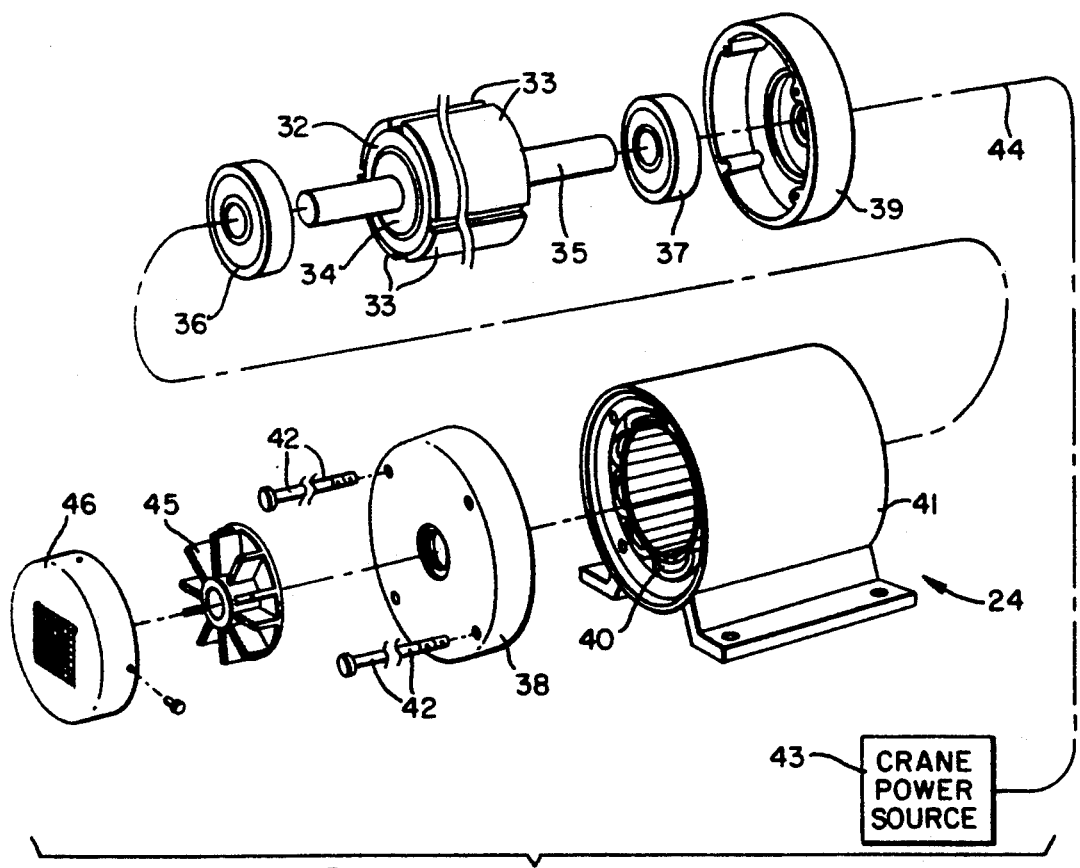
FIG. 8, an exploded perspective view of a three phase alternator used as an AC power source for the electromagnet crane installed lift magnet; and, FIG. 9, an electrical control system for the lift magnet from the three phase alternator AC power source through multi-level sequentially operated control system to the electro-magnetic lift magnet.

Referring now also to FIGS. 6, 7 and 8 the various details are shown of a new three phase alternator 24 especially adapted for use as the AC power source for control and power of 240 volt DC electro-magnet lift magnet 21 with the control system circuit 25 shown in detail in FIG. 9. The rotor steel element 32 of the alternator 24 mounts four equal length arcuate section permanent magnets 33 spaced edgewise with the magnets 33 fixed in place thereon as by bonding. FIG. 6 also illustrates the magnetic field lines of force with respect to one of the magnets 33 s condition that exists with respect to all the magnets 33, as shown in FIG. 7, which is a diagrammatic showing of the eight pole three phase alternator 24 wiring diagram with the four arcuate permanent magnets on the alternator rotor 32 straightened out for illustrative purposes.

The steel rotor element 32, as shown in FIG. 8, is mounted on cylindrical aluminum support member 34 having central support shaft 35 with opposite ends supported by ball or rotor bearing 36 and 37 in turn mounted in opposite end housing members 38 and 39 that are in turn mounted on opposite ends of alternator rotor 32 and coil 40 mounting cage 41 as by bolts 42. A crane drive motor 43, that is generally a governed diesel motor, is dirve 44 connected to drive the rotor 32 with magnets 33 and on through to cooling fan 45 held within open ended cage 46. The drive 44 can be a direct drive one-to-one or have an up speed connection such that the speed would be two-to-one or some other multiple up or down, detail-not shown.

Referring now to the electrical control system 25' as shown in FIG. 9, the electro-magnetic lift magnet 21 is subject to lift and drop control. The three phase alternator 24, with coil sections 40A, 40B and 40C, has a common connection 47 between coil sections 40A and 40C connected to Line L1, connection 48 between coil sections 40A and 40B connected to Line L2, and connection 49 between coil sections 40B and 40C connected to line L3. The lines L1, L2 and L3 are connected successively through, manually operated circuit braker switch contacts 50A, 50B and 50C, fuses 51A, 51B and 51C and then through main normally open mercury relay switch contacts 52M1, 52M2 and 52M3 connected by drive 53 to be closed by relay coil 54. This connects L1 to the cathode to anode junction between diodes 55A and 55B, line 52 to the cathode to anode junction between diodes 56A and 56B, and line L3 to the cathode to anode junction between diodes 57A and 57B in bridge rectifier circuit 28. This results in 240 volts DC (or 480 volts DC as the case may be) being applied to the lift relay contacts 58A and 58B and to the drop relay contacts 59A and 59B that are connected to reverse DC to the electro-magnetic lift magnet 21 coils when they are closed after lift relay contacts 58A and 58B are opened for lift magnet 21 drop.

The two lines L1 and L3 are also connected to DC control section 29 that controls lift and drop of the main electro-magnet lift magnet 21. Here a 12 volt (or 24 volt) battery 60, that can be the crane battery, has its positive terminal connected through manual push button switch 61 on to and through, when switch 61 is closed, relay coil 62 to the negative terminal (or ground) of battery 60. This results in the relay switch drive 63 to open normally closed relay switch contacts 64S1 and 64S4 and close normally open relay switch contacts 64S2, 64S3 and 64S5. Please note that while switches 64S3 and 64S5 are closely spaced contacts to being closed the wider spacing of relay switch contact 64S2 signifies that it is a longer time action relay switch contact taking approximately a second longer to close than the other normally open switch contacts of that multiple contact relay switch 65.

When relay switch contact 64S5 becomes closed DC starts flowing through timer circuit 66 resist or 67 for charging capacitor 68 the other side of which is connected through resistor 69 to tap 70 that is connected to ground. At the same time DC is passed through the relay coil 71 of switch relay 72 that immediately closes relay contact 73S7 and about a second later closes relay contact 73S6 with its wider Spacing signifying that it is a longer time action relay switch contact taking approximately a second longer to close than the other normally open switch contact 73S7 of switch relay 72. Closing of switch 64S3 activates relay 74 coil 75 to, through the relay drive 76, close lift contacts 58A and 58B. Then approximately a second later switch 64S2 closes activating relay coil 54 for relay drive 53 to close main relay switch contacts 52M1, 52M2, and 52M3 on the three phase AC side before rectifier 28 in turn on of power flow of DC to the lift magnet 21.

Thereafter when the push button switch 61 is pushed to open for drop activation of lift magnet 21 relay coil 62 denergizes and acting through the relay drive 63 of relay 65 returns the switches thereof to the state of FIG. 9. The coil 71 of relay 72 remains energized until the timing circuit capacitor becomes completely discharged in some two-three seconds with this timing tailored to the size and inductivity of the electro-magnet lift magnet 21. With the relay coil 71 then denergized contacts 73S6 and 73S7 open along with the contacts 52M1, 52M2 and 52M3 as driven by main relay coil 54 and lift contacts 58A and 58B are opened with deactivation of relay coil 75. Then approximately one second later the control is ready to, and does, change polarity with push button activation resulting in the closure of relay 65 contacts 64S1 and 64S4 with thereafter relay 72 contacts 73S6 and 73S7 being closed at which time the relay contacts 52M1, 52M2 and 52M3 and the drop realy 77 coil 78 is activated to, through relay drive 79, close drop contact switches 59A and 59B to change polarity in demagnetizing material held for drop from the electro-magnet lifting magnet 21. When the timing capacitor 68 is discharged coil 71 is denergized to open relay contact 73S6 and denergize main coil 54. This opens main relay contacts 52M1, 52M2 and 52M3 with the control then ready for another lift to drop cycle.

Referring again to FIG. 9 the increased spacing of contact switch 64S2 and timer circuit 66 coil 71 controlled contact switch 73S6 as compared to the spacing of relay 65 switch contacts 64S3-64S5 and relay 72 switch contact 73S7 is important in the proper sequential operation in the lift and drop cycle of crane magnet operation. These extra contact spacings aid in minimizing sparking arcs to a less than significant sparking arcs with lift contacts opening prior to opening of the main contacts. Then when the drop contacts are to open the main switch contacts open first. The alternator AC power is always opened first and thereafter DC is opened a most important feature of the control system, and secondly the alternator being the source of AC power. With arc sparking substantially the same, energy wise, as the rsistive load a mercury displacement type switch is usable, heremetically encapsulated in a stainless steel body for long life, particularly with low ameperage feed to the coils. This is with the main relay coil 54 driving a mercury switch and the contact lift and drop 58A, 58B, 59A and 59B being mercury switch controls.

Operationally with push button 61 activation of relay 65 coil 62 and closing of switch 64S2 main coil 54 is activated and main contacts 52M1, 52M2 and 52M3 are closed passing AC to the rectifier 28. Rectifier 28 converts the AC to DC passed to lift and drop contacts of the lift magnet 21 and with activation of lift contacts 58A and 58B the magnet 21 is energized for lift. Then when the main relay coil 54 goes off AC is blocked from the rectifier 28 and at this time the main magnet relay control contacts are reversed for polarity exchange. Then when the polarity is already exchanged, the main relay goes on again for approximately 2 to 3 seconds as related to magnet material release time after which the main relay again goes off and the drop operation is completed without high voltage being involved.

Whereas this invention has been described with respect to several embodiments thereof it should be realized that various changes may be made without departing from the essential-contributions to the art made by the teachings hereof.

I claim:

1. An electro-magnet lift magnet system with AC power and DC control part of the system comprising: an electro-magnetic coil equipped lift magnet; mount means for said lift magnet; an AC power source; AC to DC rectifier means connected to said AC power source; DC power source means; relay activated switch contact means connecting AC power to said AC to DC rectifier means; first relay activated lift switch contact means when closed for lift feeding DC to coil means of said lift magnet; second relay activated drop switch contact means when closed for drop feeding DC in reverse direction to said coil means of said lift magnet; relay control switch contact means; and timing circuit means connected to said DC power source means and to said relay control switch contact means controlling sequential timing activation of said first relay activated lift switch contact means and of said second relay activated drop switch contact means.

2. The electro-magnet lift magnet system of claim 1, wherein said relay control switch contact means includes a first relay switch with a relay coil and a switch drive to several normally open switch contacts and at least two normally closed contacts; and a second relay switch with a relay coil and a switch drive to at least two normally open contacts; a normally open manual push button switch for control activating both lift and drop of said electro-magnet coil equipped lift magnet; said first relay switch connected for relay coil activation when said push button is manually pushed to close;

said timing circuit means connected through a normally open switch contact of said first relay switch to said DC power source means; and the activating coil of said second relay switch includes in said timing circuit activation a short interval of time after DC power is fed thereto with closing of a normally open switch contact of said first relay switch.

3. The electro-magnet lift magnet system of claim 2, wherein said normally open switch contacts of said first relay switch includes a time delay closing switch subject to closing after the closing of other normally open switches of said first relay switch; and said second relay switch includes a time delay closing switch subject to closing after the closing of another normally open switch of said second relay switch.

4. The electro-magnet lift magnet system of claim 3, wherein said normally open time delay switch of said first relay switch connects when closed AC to the relay coil of said relay activated switch contact means; and said time delay closing switch of said second relay switch connecting a normally closed contact of said first relay switch to the relay coil of said relay activated switch contact means.

5. The electro-magnet lift magnet system of claim 4, wherein said AC power means is an AC alternator driven by a power source.

6. The electro-magnet lift magnet system of claim 5, wherein said AC alternator has mutually spaced arcuate section permanent magnets mounted on and rotational with a rotor steel tubular element of said AC alternator.

7. The electro-magnet lift magnet system of claim 5, wherein said AC alternator is a three phase alternator mounted in a crane driven by a motor also driving the crane.

8. The electro-magnet lift magnet system of claim 7, wherein said DC power source means is a battery carried by said crane that is also a battery of said crane.

9. The electro-magnet lift magnet system of claim 4, wherein said relay activated switch contact means connecting AC power to said AC to DC rectifier means is a mercury switch.

10. The electro-magnet lift magnet system of claim 9, wherein said first relay activated lift switch contact means includes relay activated circuit mercury switch closing and opening means.

11. The electro-magnet lift magnet system of claim 10, wherein said second relay activated switch contact means includes relay activated circuit mercury switch closing and opening means.

12. The electro-magnet lift magnet system of claim 11, wherein relay switch control means means is switch connected to activate said first relay activated lift switch contact means and said second relay activated drop switch contact means at mutually exclusive intervals of time.

13. The electro-magnet lift magnet system of claim 5, wherein said AC alternator is a three phase alternator with three line output connection means with each of the three AC output line AC phases connected through individual mercury switch contact means to individual cathode to anode junctions between three sets of diodes with said AC to DC rectifier means a six diode bridge rectifier.

14. The electro-magnet lift magnet system of claim 13, wherein each of the three AC output AC phase lines is connected through a manually operated circuit breaker switch contact, and also through an individual AC phase line fuse.

15. The electro-magnet lift magnet system of claim wherein said normally open manual push button is a double throw single pole switch connected for control activation both lift and drop of said electo-magnet coil equipped lift magnet.

16. The electro-magnet lift magnet system of claim 1, wherein said AC power means is an AC alternator driven by a power source; said AC alternator has mutually spaced arcuate section permanent magnets mounted on and rotational with a rotor steel tubular element of said AC alternator; and wherein said AC alternator is a three phase alternator mounted in a crane driven by a motor also driving the crane.

17. The electro-magnet lift magnet system of claim 16, wherein said DC power source means is a battery carried by said crane that is also a battery of said crane.

18. The electro-magnet lift magnet system of claim 1, wherein said relay activated switch contact means connecting AC power to said AC to DC rectifier means is a mercury switch.

19. An electro-magnet lift system with AC power and DC control part of the system comprising: an electro-magnetic coil equipped lift magnet; mount means for said lift magnet; and AC power source; AC to DC rectifier means connected to said AC power source; DC power source means; relay activated switch contact means connecting AC power to said AC to Dc rectifier means; first relay activated lift switch contact means when closed for lift feeding DC to coil means of said lift magnet; second relay activated drop switch means when closed for drop feeding DC in reverse direction to said coil means of said lift magnet; all in an AC control section with the relays activated by AC: and a DC control section with relay control switch contact means; and timing circuit means connected to said DC power source means and to said relay control switch contact means controlling sequential timing activation of said first relay activated lift switch contact means and of said second relay activated drop switch contact means.

20. The electro-magnet lift magnet system of claim 19, wherein said relay control switch contact means includes a first relay switch with a relay coil and a switch drive to severally normally open switch contacts and at least two normally closed contacts; and a second relay switch with a relay coil and a switch drive to at least two normally open contacts; a normally open manual push button for control activating both lift and drop of said electro-magnet coil equipped lift magnet: said first relay switch connected for relay coil activation when said push button is manually pushed to close; said timing circuit means connected through a normally open switch contact of said first relay switch to power source means: and the activating coil of said second relay switch includes in said timing circuit activation a short interval of tme after DC power is fed thereto with closing of a normally open switch contact of said first relay switch; said normally open switch contacts of said first realy switch includes a time delay closing switch subject to closing after the closing of other normally open switches of said first relay switch; and said second relay switch includes a time delay closing switch subject to closing after the closing of another normally open switch of said second relay switch; and wherein said normally open time delay switch of said first relay switch connects when closed AC to the relay coil of said relay activated switch contact means; and said time delay closing switch of said second realy switch connecting a normally closed contact of said first relay switch to the relay coil of said relay activated switch contact means.

* * * * *